United States Patent
George

(10) Patent No.: US 9,355,145 B2
(45) Date of Patent: May 31, 2016

(54) USER DEFINED FUNCTION CLASSIFICATION IN ANALYTICAL DATA PROCESSING SYSTEMS

(75) Inventor: Muthian George, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 293 days.

(21) Appl. No.: 13/240,582

(22) Filed: Sep. 22, 2011

(65) Prior Publication Data

US 2012/0191642 A1 Jul. 26, 2012

Related U.S. Application Data

(63) Continuation-in-part of application No. PCT/US2011/022437, filed on Jan. 25, 2011.

(51) Int. Cl.
G06F 17/30 (2006.01)

(52) U.S. Cl.
CPC .... G06F 17/30448 (2013.01); G06F 17/30463 (2013.01)

(58) Field of Classification Search
CPC .................. G06F 17/30412; G06F 17/30404; G06F 17/30451; G06F 17/30442
USPC .......... 707/600, 602, 718, 760, 763, E17.017, 707/999.004
See application file for complete search history.

(56) References Cited

U.S. PATENT DOCUMENTS

| | | | |
|---|---|---|---|
| 5,742,806 A | 4/1998 | Reiner et al. | |
| 6,067,542 A | 5/2000 | Cariño , Jr. | |
| 6,324,533 B1 | 11/2001 | Agrawal | |
| 6,385,604 B1 | 5/2002 | Bakalash et al. | |
| 6,421,665 B1 | 7/2002 | Brye et al. | |
| 6,473,750 B1 | 10/2002 | Petculescu et al. | |
| 6,775,682 B1 | 8/2004 | Ballamkonda et al. | |
| 7,383,234 B2 | 6/2008 | Iyer et al. | |
| 7,836,066 B2 | 11/2010 | Chang et al. | |
| 7,840,545 B2 | 11/2010 | Hacigumus et al. | |
| 8,082,273 B2 | 12/2011 | Brown et al. | |

(Continued)

FOREIGN PATENT DOCUMENTS

| | | |
|---|---|---|
| CN | 1758248 | 4/2006 |
| CN | 101582079 | 11/2009 |

(Continued)

OTHER PUBLICATIONS

Purich, Oracle CEP CQL Language Reference, 11g Release 1 (11.1.1), May 2009, pp. 10-1 to 10-6; http://docs.oracle.com/cd/E16764_01/doc.1111/e12048/funcusr.htm#CJAGIBDA.*

(Continued)

*Primary Examiner* — Miranda Huang
(74) *Attorney, Agent, or Firm* — Tarolli, Sundheim, Covell & Tummino L.L.P.

(57) ABSTRACT

Systems and apparatuses are provided for integrating user defined functions into an analytical data processing framework. The system includes a plurality of user defined functions (28), each having metadata defining an associated class type. A query compiler (22) identifies a call to a user defined function (28) within a query of an associated data table (26), retrieves the associated class type of the user defined function from the metadata, and provides a query plan according to a plurality of processing instructions derived from the retrieved class type.

13 Claims, 2 Drawing Sheets

(56) References Cited

U.S. PATENT DOCUMENTS

| | | |
|---|---|---|
| 8,538,954 B2 | 9/2013 | George |
| 8,856,151 B2 | 10/2014 | George |
| 9,229,984 B2 | 1/2016 | George |
| 2003/0028509 A1 | 2/2003 | Sah |
| 2003/0037048 A1 | 2/2003 | Kabra et al. |
| 2005/0177579 A1 | 8/2005 | Blakeley et al. |
| 2005/0228794 A1 | 10/2005 | Navas et al. |
| 2006/0010159 A1 | 1/2006 | Mirchandani et al. |
| 2006/0020620 A1* | 1/2006 | Iyer et al. ............ 707/102 |
| 2006/0041544 A1* | 2/2006 | Santosuosso ............ 707/4 |
| 2006/0136415 A1* | 6/2006 | Ramsey et al. ............ 707/7 |
| 2006/0218123 A1 | 9/2006 | Chowdhuri et al. |
| 2009/0089560 A1* | 4/2009 | Liu et al. ............ 712/226 |
| 2009/0112799 A1* | 4/2009 | Barsness et al. ............ 707/3 |
| 2009/0150907 A1 | 6/2009 | Aharoni et al. |
| 2010/0023471 A1 | 1/2010 | Baldwin et al. |
| 2010/0036801 A1 | 2/2010 | Pirvali et al. |
| 2010/0241646 A1 | 9/2010 | Friedman et al. |
| 2010/0250572 A1 | 9/2010 | Chen et al. |
| 2011/0040773 A1 | 2/2011 | Danesi et al. |
| 2011/0047172 A1 | 2/2011 | Chen et al. |
| 2011/0082868 A1 | 4/2011 | Musuluri |
| 2011/0161352 A1 | 6/2011 | de Castro Alves et al. |
| 2011/0161356 A1 | 6/2011 | de Castro Alves et al. |
| 2011/0196891 A1 | 8/2011 | de Castro Alves et al. |
| 2012/0005190 A1 | 1/2012 | Faerber et al. |
| 2012/0084250 A1* | 4/2012 | Gundorov ...... G06F 17/30592 707/600 |
| 2012/0110001 A1 | 5/2012 | Young |
| 2012/0130963 A1* | 5/2012 | Luo et al. ............ 707/693 |
| 2012/0239612 A1 | 9/2012 | George |
| 2013/0031139 A1 | 1/2013 | Chen et al. |
| 2013/0238548 A1 | 9/2013 | George |
| 2014/0006383 A1 | 1/2014 | Hacigumus |

FOREIGN PATENT DOCUMENTS

| | | | |
|---|---|---|---|
| EP | 0 455 447 A3 | 4/1991 | |
| EP | 0 459 683 A3 | 12/1991 | |

OTHER PUBLICATIONS

Chen et al., Extend UDF Technology for Integrated Analytics, T.B. Pedersen, M.K. Mohania, and AM. Tjoa (Eds.): DaWaK 2009, LNCS 5691, 2009 (15 pages).

Chen et al, "Data Continuous SOL Process Model", OTM 2008, pp. 175-192.

Chen et al, "Efficiently Support MapReduce-like Computation Models Inside Parallel DBMS", Ideas 2009, Sep. 16-18,pp. 43-53.

European Patent Office, European Search Report for Appl. No. 11856881.5 dated Oct. 5, 2015 (8 pages).

Garcia-Alvarado et al., OLAP with UDFs in Digital Libraries, Proceeding of the 18th ACM Conference on Information and Knowledge Management, 2009 (2 pages).

Korean Intellectual Property Office, International Search Report and Written Opinion for PCT/US2011/022437 dated Sep. 19, 2011 (9 pages).

Pal, S. et al.; "Xml Best Practices for Microsoft SQL Server 2005"; Microsoft SQL Server; Apr. 2007; 23 pages.

The International Bureau of WIPO, International Preliminary Report on Patentability for PCT/US2011/022437 dated Aug. 8, 2013 (5 pages).

* cited by examiner

USER DEFINED FUNCTION CLASSIFICATION IN ANALYTICAL DATA PROCESSING SYSTEMS

RELATED APPLICATIONS

The present invention claims priority from and is a Continuation-in-Part of PCT/US11/22437 filed on 25 Jan. 2011.

TECHNICAL FIELD

This invention relates to information processing, and more particularly, to classification of user defined functions for integration into analytic systems.

BACKGROUND

Analytical data processing systems consume a table of data which is typically generated in a query from tables linked together by relationships in databases that simplify the storage of data and make queries of the data more efficient. A standardized query language, such as Structured Query Language (SQL), can be used for creating and operating on relational databases. Analytic data processing involving statistical or other numeric data processing applies computer technology to solve problems in business and industry. The science of analytics is concerned with extracting useful properties of data sets using computable functions from large structured and unstructured data stores, and generally from large databases. Analytics therefore bridges the disciplines of computer science, statistics, and mathematics.

DETAILED DESCRIPTION

Databases have the framework for processing a limited number of in-built analytic functions in queries using GROUP BY and OLAP window clauses. Unfortunately, real-world analytical problems in databases go beyond the analytic functions natively supported, and datasets in databases that require intensive analytical processing often end up using third party analytical packages for analytical processing. In situations where the datasets are large, they are often retained outside the databases due to the limited analytical capabilities available in databases. Analytical packages require data to be retrieved from databases, persisted outside the database, and reformatted before processing. Since these approaches move data away from the database tables to a location associated with the analytical processes, the result is a replication of same large raw data sets in different formats in multiple locations, with the accompanying security and data governance risk for confidential data. Further, this approach results in excessive manpower and hardware cost for data retrieval, management, and storage as well as significant latency in processing, making it impractical for real-time analytics.

Analytical data processing functions vary from one another in structure, functionality, and scenario of processing. The SQL OLAP framework supports processing scenarios for a limited set of inbuilt analytical functions. Databases use function names to validate and resolve the syntactic and semantic correctness of the inbuilt functions when used with one of GROUP BY and OLAP window expressions.

Figure 1:
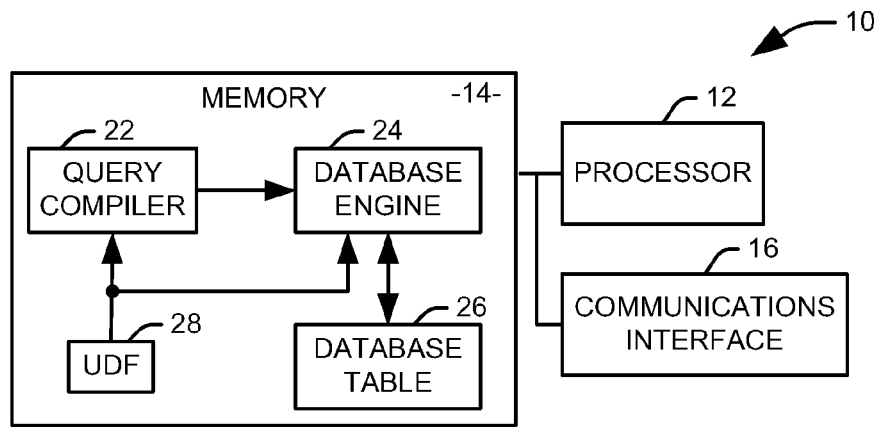
FIG. 1 illustrates an example of an analytical processing system having integrated user defined functions (UDF) that are organized according to predefined function class types.

FIG. 1 illustrates an example of an analytical processing system 10 having integrated user defined functions (UDF) that are organized according to predefined function class types. For example, the system 10 of FIG. 1 can represent a database system, a data warehouse, a data mart, an in-memory database, a standalone analytics engine, a business intelligence report generation system, a data mining system, or a federated query processing system. By introducing function class types into analytic processing, it becomes easier to support analytic data processing functions beyond inbuilt functions with user defined functions within SQL GROUP BY and OLAP window frameworks, and without them.

In general, the analytics system can be processed in a plurality of functional components 22, 24, 26, and 28, each of which can be implemented as any appropriate combination of hardware and programming configured to perform their associated functions. In the illustrated example, each of the query compiler 22, the processing engine 24, the data tables 26, and the user defined function 28 is stored on a non-transitory medium and executed by an associated processor, but it will be appreciated that other implementations of the functional components, for example, as dedicated hardware or as a combination of hardware and machine readable instructions, could be used.

The example system 10 includes a processor 12 and a memory 14 connected to a communications interface 16. It will further be appreciated that the memory 14 can be a removable memory, connected to the processor 12 and the communications interface 16 through an appropriate port or drive, such as an optical drive, a USB port, or other appropriate interface. Further, the memory 14 can be remote from the processor 12, with machine readable instructions stored on the memory provided to the processor via a communications link. It will be appreciated that the communication interface 16 can comprise any appropriate hardware and machine readable instructions for receiving queries from an associated query source (not shown) and returning the results of the queries to the query source. Accordingly, the communications interface 16 can include any or all of a bus or similar data connection within a computer system or a wired or wireless network adapter. The memory 14 can include any set of one or more operatively connected storage devices appropriate for use with computer systems, such as magnetic and optical storage media The device memory 14 can include a query compiler 22, a processing engine 24 to compile and execute queries on data tables 26, and a user defined function (UDF) 28. The query complier 22 can utilize any appropriate query language, for example, structured query language (SQL) or multidimensional expression (MDX) language or any procedural language. In one implementation, the user defined function 28 is stored as one of a shared object or a dynamic link library. In the illustrated system, the user defined function 28 includes exposed metadata defining an associated class type of the user defined function. The class type of the user defined function 28 can define one or more properties of the function, such as a cardinality of output rows of the user defined function, an associated processing scenario of the function, and appropriate usage semantics of the user defined function in a query. By grouping user defined functions into one of a plurality of predetermined function class types, these various properties can be efficiently stored in the metadata and conveyed to the query complier or the processing system.

The query compiler 22 identifies a call to a user defined function 28 within a query and retrieves an associated class type from the metadata of the user defined function. Using this information, the query is validated, and a query plan is produced that includes the user defined function. For example, the one or more properties of the user defined function 28 can include a set of rules for validating the query and preparing the query plan as well as instructions for how various input rows are provided to the function. In one example, the set of rules can include a processing instruction indicating that an output field of the user defined function can be projected into a SELECT projection list of the query.

The user defined function class type implicitly sets the rules for data processing in the processing engine along with the cardinality of their output results. For example, user defined functions belonging to some class type that require OLAP windows will be processed in OLAP windows, whereas such processing is not appropriate for other class types of functions. Similarly, different class types can have different output cardinality, with some class types providing a determinate and others providing indeterminate number of output rows. Class types with a determinate output can be processed in a manner similar to the way the current OLAP inbuilt functions are processed. Indeterminate output functions can be restricted such that only one indeterminate output function appears in a given query or subquery. However, with appropriate query optimization and join processing, this restriction can be removed in advanced implementations. Unlike inbuilt functions that return only one output field, all the user defined function class types may return one or multiple output fields.

In one implementation, user defined functions can be associated with any of ten class types. Aggregate UDF class type processes a set of rows partitioned by a GROUP BY expression or an OLAP window PARTITION BY expression and returns only one output row per input row set. Without a GROUP BY expression or an OLAP window PARTITION BY clause, the whole table data from the query is considered as the input set. Rank-type UDF class type processes a set of rows and return one row per input row. Generally, the input rows are partitioned by an OLAP window PARTITION BY clause and sorted in the ORDER BY clause when data sorting is required. Series UDFs are processed by OLAP PARTITION BY and a subset window frame of ROWS or RANGE clauses. It will be appreciated that aggregate and series class types are not mutually exclusive, and that a given user defined function can belong to either or both the class types.

Series UDF with Inbuilt Window Frames (SIWF) class type is similar to series user defined function class type except that it uses one or more inbuilt window frames for moving window or running aggregate processing. OLAP supports one window frame in a window frame specification. SIWF class type is particularly useful for analytic functions that require more than one window frame. Slow and fast moving window frames are often used for spotting valleys and peaks of plotted time-series graphs. An SIWF UDF receives the window frame sizes through parameter specification. The function receives one input row at a time and returns one output aggregate return row for the result generated using the window frame sizes given. The SIWF class type supports fast computations for moving window aggregates away from the OLAP window frames. The SIWF class type of functions can use the OLAP PARTITION BY expression and the OLAP ORDER BY clause if the input is required in a sorted order.

A Multiple Rows Returning Aggregate UDF (MRRA) class type is similar to the aggregate class type, except that MRRA functions return more than one row per set of input rows processed. MRRA functions can process a set of rows partitioned by GROUP BY or OLAP PARTITION BY clause, or, in the absence of such a clause, the whole table data from the query can be considered as the input set. N-To-M (NTM) UDF class type functions are a special type of user defined function that process a set of N input rows and generate M output rows. NTM functions can use OLAP PARTITION BY and ORDER BY for processing. The number of output rows can be more than, less than, or equal to the number of input rows. NTM class type does not aggregate input data, though it otherwise resembles MRRA class type. The output cardinality of MRRA and NTM class types are indeterminate.

One-To-M (OTM) UDFs are a class type of user defined functions that process one input row at a time and produce zero, one or multiple rows of output. OTM functions do not require OLAP windows or GROUP BY support. Value Generating UDF class type generates one row of output per one row of input. They are similar to inbuilt math, string or date functions. There can be value generating user defined functions without input arguments similar to CURRENT_DATE( ) or PI( ) A row-sending UDF class type does not return any output, but instead supplies data to an external process by processing input rows. A row-sending UDF can be used in a SELECT query statement to send a set of rows to an external process. In order to work with the SELECT query statement, a row-sending UDF can return the number of rows sent, although it is possible that no output rows are returned. For example, in one instance, a data storage system can be configured to automatically send any modified rows via a row-sending function whenever a data table is modified.

Table-Valued user defined function (TVUDF) class type occurs in the FROM clause of SQL queries, where the table it returns can participate in relational set processing similar to regular database tables. TVUDFs mostly connect to external structured or unstructured data sources and return structured tabular data for query processing. TVUDFs do not require input field arguments and are used for generating tables from external data sources. In such a case, inputs for the table extraction are given as parameters mostly in the form of a query statement and the function receives an empty input table object to populate an output table from the external source. When UDFs have parameterized external queries for processing in the external data sources, they will have input fields from the local query corresponding to the external query parameters. Input argument fields for the UDFs supply parameter values for external query processing in the external data source. Such UDFs belong to the OTM class type. Parameterized OTM class types are used in the projection list of the SELECT statement and not in the FROM clause, although they resemble TVUDFs.

Once the query plan has been generated, it is provided to the processing engine 24 where the query, including the user defined function 28, can be processed to provide an output for the query. It will be appreciated that this output can be provided to the external program that sent the query for processing, or to a data table when the query is a part of an INSERT statement, or to an external program when the query has a row-sending UDF. Since the user defined function 28 is integrated into the analytics system, the output can generally be projected back into a SELECT list of the query or subquery, allowing for further analytics to be performed in nested queries using the function output.

Figure 2:
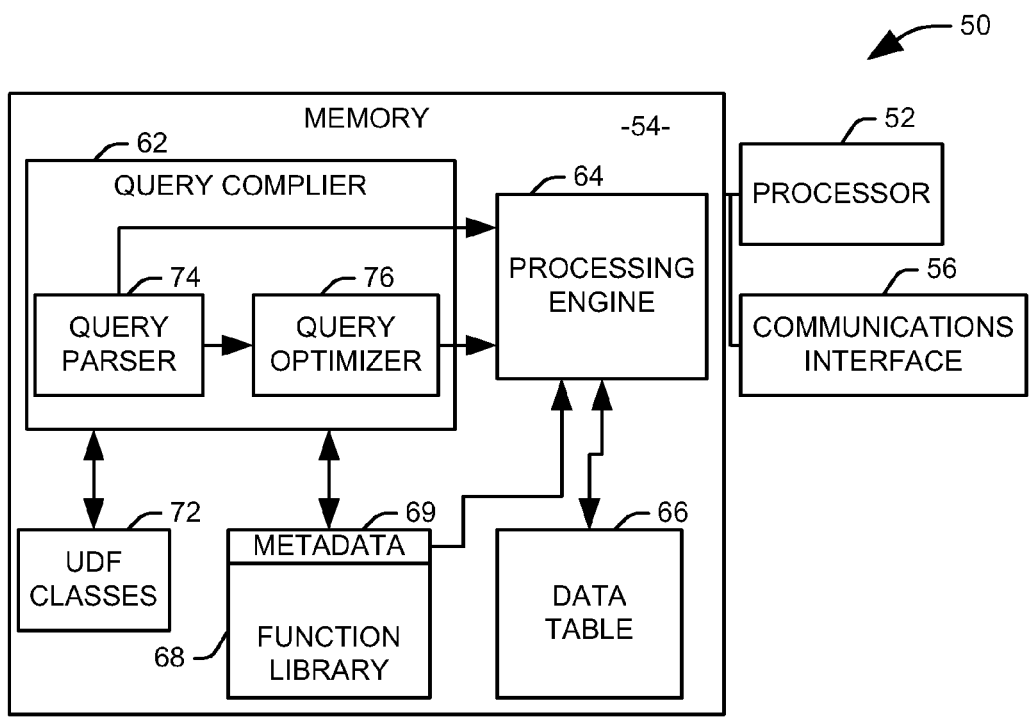
FIG. 2 illustrates one example of an analytical processing system utilizing user defined functions organized into discrete class types.

FIG. 2 illustrates one example of an analytical processing system 50 utilizing user defined functions organized into discrete class types. Specifically, the example analytical processing system is implemented as a database system 50, with user defined functions (UDF) integrated into an online analytics processing (OLAP) and GROUP BY processing framework. It will be appreciated, however, that the UDF class types is not specific to SQL OLAP applications or even database applications, and a similar classification of UDFs could be implemented in other analytical processing systems.

The system 50 includes a processor 52 and a memory 54 connected to a communications interface 56. It will be appreciated that the communication interface 56 can comprise any appropriate hardware and machine readable instructions for receiving queries from an associated query source (not shown) and returning the results of the queries to the query source. Accordingly, the communications interface 56 can include any or all of a bus or similar data connection within a computer system or a wired or wireless network adapter. The memory 54 can include any appropriate standard storage devices associated with computer systems, such as magnetic and optical storage media.

The device memory 54 can include a query compiler 62 and a processing engine 64 to compile and execute queries on data tables 66. The query compiler 62 includes a query parser 74 and a query optimizer 76. The query parser 74 can identify a call to a user defined function within the query and determine its class type from its metadata and validate the semantic correctness of its syntactic specification in the query. The query parser 74 processes a call to a user defined function in a query using a standardized user defined function syntax to distinctly map input, output, and parameter expressions to appropriate objects. Lists of fields in the input and output expressions define rows of data that can be composed into tables. In the illustrated implementation, each list of fields within parentheses following the user defined function name. Inputs are extracted from query fields, and composed as an input table. Output fields are denoted with a keyword OUTPUT and a list of fields in parentheses. The query parser 74 structures these input and output fields into self-describing table objects with field names, data types and data size to standardize processing of all user defined function class types with the ability for handling multiple records simultaneously. Each table object has metadata to describe each field of the table object in terms of its name, data type, field nullability and data length. Tables also have the ability to store and retrieve rows of data based on row number. They are capable of handling large row sets with the ability to manage memory overflow of rows into disk files.

In one implementation, the user defined functions are built in a UDF library 68, for example as shared objects or dynamic link libraries, and registered with the processing engine. Each shared object exposes the user defined functions in the form of self-describing UDF metadata 69 that can be retrieved by the query compiler 62. The UDF metadata 69 can include a name of the user defined function, a description, an associated class type, a factory constructor function pointer to create a runtime analytic processing object instance, a function pointer for the validation and resolution of input, output and parameters, and other runtime optimization parameters, as well as defined input, output and parameter fields for the function. The query compiler 64 accesses these fields for UDF resolution and validation in the query. The input and output fields can be either fixed or variable fields. Each fixed field represents only one field during execution of the query, while each variable field can represent a minimum of zero or one, and a maximum variant number of fields defined in a call to the user defined function during query compilation. When input and output fields are marked as variable, they can be repeated starting from a minimum of zero or one and a maximum number defined in the call to the user defined function at the time of query processing. It will be appreciated that variable fields can occur at any input or output position, and there can be multiple variable fields in input and output. The number of variants for a variable field for a given call to the function can be provided, for example, only as an integer parameter expression. Parameters can be used for many processing requirements of a user defined function. The parameter expression can be used to define scalar or array integer, double, string, date, time and timestamp values used for processing in the user defined function.

Input and output fields are marked as fixed or variable types in the input and output metadata of each user defined function. It will be appreciated that a given user defined function can have a standard order and number of inputs, as defined in the input metadata for the function. Each field is referenced by a corresponding input argument field for fixed fields and multiple field arguments for variable fields in the query. Specifically, fixed fields will have only one corresponding input argument field and variable fields can have a minimum of zero or one and a maximum number of consecutive input argument fields in a call to the user defined function in the query. Input and output fields can have fixed or undefined data types within the metadata. When the data type of an input field is marked as undefined, the field obtains its data type from the data type of the corresponding input field argument in the query. Query input field defines if the field has null value or not. For fields having a fixed data type, data from the input query field is converted to the desired input field type of the user defined function at runtime when the data types do not match and the data type promotion is valid. When the data type is undefined in an output field, it is set to depend upon an input field for data type resolution. At the query complier 62, undefined output fields are resolved from the input fields. The metadata can also include default output fields, which are returned when a query does not explicitly map output fields. There must be at least one default output field for a user defined function.

When there is only a single input variable field, it is resolved at the query compiler 62 from the input arguments in the query. Specifically, a repetition number for the variable field can be computationally determined as the difference between the total number of input arguments and the number of fixed input fields defined in the user defined function metadata. When there are multiple input or output variable fields, parameter fields are required to provide the repetition number, with each variable field having a corresponding integer parameter metadata field. When the query is processed, the parameter input is used for validating and resolving the repetition number for the variable fields. The names for the variable input and output fields can be generated serially by extending the base name of the variable field with a number incrementally starting from one. The fixed data type of all the variable input and output fields is same as the field marked as variable. The undefined data type of the variable input field is resolved by the data type of the corresponding variable input field on which the output field is set to depend. A general purpose function supplied with the system can be used to validate input and output fields, and parameters to resolve their data types and lengths at the query compiler 62 when explicit validation and resolution function is not supplied by the user defined function as a function pointer in the metadata.

The metadata 69 for each user defined function can include an associated class type for each function out of a plurality of function class types 72 to assist in the usage validation and optimization of the query. The user defined function class types implicitly set the rules for data processing in the processing engine along with the cardinality of their output results. For example, user defined functions belonging to some class types will be processed in OLAP windows, whereas such processing is inappropriate for other class types of functions. Similarly, the class type can indicate the cardinality of the output of the user defined function, such that the various class types can be considered "determinate" or "indeterminate". Determinate cardinality class types return well defined and fixed number of output rows with respect to the number of input rows. Indeterminate cardinality class types do not have a well defined number of output rows with respect to the number of input rows. Unlike inbuilt functions that return only one output field, all the user defined function class types may return one or multiple output fields. In addition to the class type, the metadata for each function can indicate an associated processing scenario. Specifically, it can be indicated whether the function will utilize one input row at a time for processing, finalizing the output when all the rows from a given input have been sent, or if an entire set of data is required in one lot for processing simultaneously. Therefore, the metadata for a given UDF indicates if it processes one input row at a time or processes the entire set of input rows at the same time. Similarly, many UDFs can accept input rows without previous sorting, although some UDFs are required to receive input rows in a sorted order. Accordingly, the metadata of a UDF can indicate if the UDF accepts data in a sorted order and, if so, in what order, in ascending, descending, or either order.

In the illustrated implementation, each UDF in the UDF library 68 can be assigned one of ten class types. A UDF belonging to an aggregate class type performs data reduction operation by consuming N number of input rows, where N is an integer greater than one, to produce one output row. Aggregate UDFs are compatible with OLAP windows PARTION BY processing and can work with the GROUP BY clause as well. They produce a determinate number of only one output row. For example, a partition processor can generate sets of data from the query table based on the fields in the data partition specification and the aggregate UDF processes each partition set to produce an output row.

The following example query shows an aggregate UDF named CentralTendency that computes mean, median and mode values from the input field "salesValue" from a table "salesTable." This UDF is configured to receive all the input rows together, in sorted order.

```
SELECT country, region, year,
    CentralTendency(salesValue) OUTPUT(
        mean AS meanSales,
        median AS medianSales,
        mode AS modeSales)
    OVER(PARTITION BY country, region, year
        ORDER BY salesValue ASC)
FROM salesTable;
```

Rank-type UDFs process N input rows, where N is an integer greater than one, and produce N output rows. Rank-type UDFs are determinate and compatible with OLAP windows, such that they can be partitioned using an OLAP PARTITION BY expression. When the OLAP window is devoid of PARTITION BY clause, all rows from the referenced query table are used for processing. Generally, rank-type UDFs receive data ordered within the subset produced by the OLAP data partitioning, and, if mandatory, these data ordering guidelines are noted in the UDF metadata. When a rank-type UDF does not need data ordering, the input data fields are supplied to the UDF without ordering. When input arguments and ORDER BY expression are present for a UDF, the query compiler sorts the rows first according to the sort order in the ORDER BY clause and passes the ordered list of fields from the rows as input to the UDF.

Rank-type UDFs generally are comparison analytic functions where data across the rows with the same fields are compared. Analytics such as percentage share and actual/expected comparison analytics are rank-type analytics. In the following example of a rank-type analytic function, actual quarterly sales values of various sales persons for each year in the database are compared against the expected values. When input argument fields are given for a rank-type user defined function call, the sort fields are not passed as input arguments. If the sort fields are required for processing in the user defined function, they have to be explicitly supplied as input arguments to the function.

```
SELECT ST.salesPersonName, E.year, E.quarter,
    CmpareActualExpected(E.expected, ST.sumSales)
        OUTPUT(actual, expected,
            actualPercent, expectedPercent,
            cumulativeActual, cumulativeExpected,
            cumulativeActualPercent, cumulativeExpectedPercent)
    OVER(PARTITON BY E.salespersonId, E.year
        ORDER BY E.quarter)
FROM expectedSales E,
    (SELECT T.salespersonId, salesPersonName, S.year, S.quarter,
        sum(S.salesValue)
        OVER(PARTITION BY S.year, S.quarter) AS sumSales
    FROM sales S, salesTeam T
    WHERE S.salespersonId = T.salesPersonId) AS ST
WHERE E.year = ST.year AND E.quarter = ST.quarter AND
    E.salespersonId = ST.salespersonId;
```

Series UDFs are compatible with OLAP window processing and their output cardinality is determinate. Among the inbuilt OLAP analytic functions, all the aggregate functions are used as series analytic functions when OLAP windows frame specification with ROWS or RANGE is given. In the illustrated system 50, UDFs are marked either as the aggregate class type, the series class type, or both class types. When a user defined function is marked as aggregate and series class type, the presence or absence of windows frame specification in a call to the function using either ROWS or RANGE determines if the computation is aggregate or series. Series computations must specify windows frame specification with either of ROWS and RANGE syntax. Series UDFs can be used to perform moving window analytics, in which a fixed window frame size is defined in a call to the user defined function and the window frame size number of rows with respect to the current row are used in the moving computations. Series UDFs can also be used for cumulative data processing with unbounded PRECEEDNG or FOLLOWING moving window expressions. They can also be used in moving series analytics using either ROWS or RANGE window frame expressions.

Series analytic UDFs are used for studying the trends in the data mostly over a period of time. When a time interval is involved in the analytical computation, series analytics are called time series analytics. Analytics involving time-sliced sensor data or continuously transacting systems, such as the stock market data, belong to the time series analytic category. In the following example of a series UDF, a moving window series analytics is performed to compute Bollinger Bands on one minute bar data of the recent 180 days for all stocks with low and high bands having twice the standard deviation from the mid average band in a database.

```
SELECT T.stockSymbol, BollingerBands((T.close+T.open+T.low)/3.0)
    OUTPUT(lowerBand, midBand, upperBand)
        WITH PARAMETER(STD_DEV_SIGMA=2.0)
    OVER(PATITION BY T.stockSymbol
        ORDER BY T.period ASC ROWS 100 PRECEEDING)
FROM oneMinuteBarData AS T
WHERE T.period > (CURRENT_DATE( ) - INTERVAL 180 DAY);
```

Series with Inbuilt Window Frame (SIWF) UDFs are a special type of series UDF class type designed for performing fast computations for moving window frame analytics. Like the series class type of UDFs, SIWF UDFs are compatible with OLAP window processing and their output cardinality is determinate. For SIWF UDFs, the query supplies the window frame size as a parameter value. The UDF implementation maintains a circular array of window frame size obtained from the parameter input to maintain the preceding frame size of input rows. SIWF UDFs receive only one row at a time, and compute the output fields, returning the output row for each input row processed.

SIWF and standard series analytic UDFs return the same result when there is only one window frame specification using ROWS PRECEEDING expression for the series analytics. OLAP windows frames by ROWS and RANGE are general solutions for a wide variety of series analytics applications. SIWF has the implementation flexibility to support a wide variety of real-time analytics in which the analytic application manages one or more moving window frame sizes. For example, stock market technical analytics process a variety of technical time-series analytics at varying periodicity with multiple window frames. The analytics may be performed on bar data of stocks at one minute, ten minute, one hour, one day or one week intervals. Bar data can include a period timestamp, volume of stock, and open, close, high and low stock prices traded within a certain period. However, within an interval there could be multiple updates. Each update within the same period interval is not new data but the same data for the period interval. SIWF is designed to support the computation of multiple such updates within an interval for technical analytics computations of stock market bar data or any other real-time series analytics such as sensor data. The Bollinger Bands analytics in SIWF UDF is represented in the following query. It will be noted that the SQL engine supplies one row at a time which is the current row.

```
SELECT T.stockSymbol, BollingerBands((T.close+T.open+T.low)/3.0)
    OUTPUT(lowerBand, midBand, upperBand)
        WITH PARAMETER(STD_DEV_SIGMA=2.0;
            WINDOW_FRAME_SIZE=100)
        OVER(PATITION BY T.stockSymbol
            ORDER BY T.period ASC ROWS CURRENT ROW)
FROM oneMinuteBarData AS T
WHERE T.period > (CURRENT_DATE( ) - INTERVAL 180 DAY);
```

There are moving series analytics that utilize more than one windows frame size, particularly when differential moving analytic studies are conducted. One such analytic application is a Moving Average Convergence/Divergence (MACD). MACD uses both fast and slow window frame sizes to study trading stock price convergence and divergence to generate stock buy and sell signals. For such analytic functions, the standard OLAP window frame is not sufficient, because OLAP window frame can support only one window frame specification. SIWF UDFs are designed to support one or more window frames to allow for efficient processing of these analytics. When the UDF framework is integrated with systems not operating in a SQL OLAP environment, particularly systems that conduct real-time stock technical analytics, SIWF UDFs can be employed to implement desired analytics with one or more window frames.

Multiple Row Returning Aggregate (MRRA) UDFs are aggregates UDFs that return indeterminate number of output rows. MRRA UDFs are compatible with OLAP processing and their output cardinality is indeterminate. In general, MRRA UDFs receive input rows one row at a time and the rows need not be sorted, but exceptions exist, and therefore, the metadata for a MRRA UDF indicates if it processes one input row at a time or receives the entire set of input rows at the same time with specification for sorting requirement.

MRRA UDFs, like the N-to-M UDFs described below, provide a plurality of input rows and can receive back an indeterminate number of output rows. The MRRA class type is distinct from the N-to-M class type, however, as MRRA UDFs exhibit properties closer to aggregate functions and generally return fewer output rows than the number of input rows. A number of statistical analytic applications can be represented as MRRA UDFs, such as frequency distributions of continuous variables, and model fitting least-squares, maximum likelihood, and multivariate statistical analytics. An example analytical application is given below for the MRRA class type that fits data to an arbitrary least-squares model where the model is specified using parameters. The example assumes that any number of two-way interactions can be given as pairs of consecutive variable identifiers in the parameter input. In the example least-squares model, only one two-way interaction is given. The least-squares model and query are given below:

```
Least-squares model: Y_{ijkl} = μ + X_i + Y_j + Z_k + Y_jZ_k + e_{ijkl}
SELECT P.productName, LeastSquares(S.salesValue,
    G.year, G.region, S.salesMethod)
    OUTPUT ($1 sourceVariableName, $2 degreeOfFreedom,
        $3 sumOfSquares, $4 meanSumOfSquares, $5 FValue)
    WITH PARAMETER(COUNT_FACTOR=3:
        TWO_WAY_INTERACTION_ID=2,3)
FROM sales S, geography G, product P
WHERE S.CountryId = G.CountryId AND S.RegionId = G.RegionId
AND
    S.ProductId = P.ProductId
GROUP BY P.ProductId;
```

The least-squares UDF is implemented to accept the dependent variable as the first input argument. The independent factor variables are given as a single variable input field in the UDF metadata that is set to dependent upon parameter field COUNT_FACTOR. The variable field expands into a number of fields taken from the parameter input from COUNT_FACTOR. The above query fits the least-squares equation for each set of data belonging to the product group generated by the GROUP BY clause and returns one row each for year, region, and sales-method factors, a fourth row for region and sales-method interaction, and the last row for total. Thus, the UDF returns five rows. Each row contains the variable name, degrees of freedom, sum of squares, means sum of squares, and F-value column fields. When MRRA UDFs return multiple rows, the SQL engine replicates the columns outside of the UDF output in the select-projection list across all the rows. In this example, P.productName is replicated for all of the output rows.

N-To-M (NTM) UDFs consume a plurality of input rows and can output a different number of output rows. NTM UDFs are compatible with OLAP processing and are indeterminate. The number of output rows could be zero, one or more than one, and can exceed the number of input rows or be less than the number of input rows. NTM UDFs utilize OLAP PARTITION BY and ORDER BY clauses of the OLAP windows specification.

Many of the data mining analytics, such as market basket analytics, belong to the NTM UDF class type. The following example query shows the use of market basket analytic UDF:

```
SELECT country, region, MarketBasket(transId, itemName)
    OUTPUT(ruleId, ruleLevel, lhsRuleItemList, rhsRuleItemList,
        supportPercent, confidencePercent)
    WITH PARAMETER(MIN_SUPPORT=25.0:
        MIN_CONFIDENCE=60.0:MAX_RULE_LEVEL=4)
    OVER(PARTITION BY country, region)
    FROM saleTrans;
```

The above query generates market basket confidence and support values for rules generated up to four levels of item combinations for each country and region basket transaction data sets. In this example, for each set of rows generated from the user defined function country and region are replicated. The query processes a sales transaction table that contains at least two columns, transId and itemName. The MarketBasket UDF receives the two columns as input and produces six output fields as in the OUTPUT specification. The parameters provide specification for processing where MIN_SUPPORT defines the minimum percent of rule support. The MIN_CONFIDENCE field defines the filter condition to filter out the generated confidence interval values for the rules below sixty percent and consider only the rules that satisfy the values equal to and above it. The parameter field MAX_RULE_LEVEL determines the maximum rule level for generating the rules combinations of items. In this example, level four is the cutoff level for rule items combination generation.

One-To-Many (OTM) UDFs process one row at a time and produce zero, one or more output rows. OTM UDFs can operate without OLAP window support and their cardinality is indeterminate. OTM UDFs can be conceptualized as two general types. The first type is used for generating values from the input arguments. Although it resembles a value generating UDF, the OTM UDF can generate multiple rows for each input row. In the example below, when product-wise emails are stored in a database, MapQualifer returns one or more prodQualifer values for each product from the product users in a sub-query. In the main query product qualifiers are counted for each product to arrive at the sentiments expressed for products by users.

```
SELECT M.prodName, M.prodQualifer, count(*) AS sentimentCount
    FROM (SELECT P.productName AS prodName,
        MapQualifer(P.productName, U.email)
            OUTPUT($1 AS prodQualifer)
        FROM product P, prodUser U
        WHERE P.productId = U.productId) AS M
    GROUP BY M.prodName, M.prodQualifer;
```

The second type of OTM UDFs resembles a Table-Valued User Defined Function (TVUDF). Like TVUDFs, these OTM UDFs process data from external data sources. However, the second type of OTM UDFs are used for processing data from external sources when external processing uses input values from the local query table, and thus have input arguments. Therefore, for each row processed in the local query, input values for the OTM UDF are passed from the local query table. For each input passed to the OTM UDF, the OTM UDF returns zero, one or more number of output rows.

For example, when parameterized queries are passed to an external data source for processing, parameter values for the external query are sent from the rows of the local query table as input arguments to the OTM UDF. Thus, in general, the input arguments to the OTM UDFs supply the parameter values for the external parameterized queries. Similarly, input arguments from local query table can be passed to external data sources for filtering data in OTM UDFs according to local query needs. Since OTM UDFs could return multiple rows for a single input, all the projection fields outside of the output from the UDF are replicated across all the rows returned by the UDF for that input row. An example of a query utilizing the second type of OTM UDF, listed below, processes sub-queries against different geographical databases and combines their results to produce the global sales value of computer and printer sales in a single query.

```
SELECT productName, ODBCQueryProcessor(productName)
    OUTPUT($1 AS sumSales)
    WITH PARAMETER(ODBC_DSN='USSalesDB':
        USER='admin','secret':QUERY=
        'SELECT sum(S.salesValue)
        FROM sales S, product P
        WHERE P.productId = S.productId AND P.productName = ?
        GROUP BY S.productId')
FROM product
WHERE product.productName = 'computer' OR
    product.productName = 'printer';
```

Value generating UDFs are usually simple data transformation or extraction functions, and they can appear anywhere in a query in which an expression can occur. They are not used with OLAP windows and their output cardinality is determinate. Functions in the math, date and string libraries belong to the data transformation category. All the value generating functions that have input arguments take one or more fields from the query table one row at a time, process the input and return one row having one or more output fields. While the inbuilt value generating functions return a scalar output field, value generating UDFs return one or more output fields. Functions such as CURRENT_DATE and PI are extraction functions that return values without any input argument. To extract runtime information associated with a computer, such as the number of processors, processor speed, processor usage statistics, disk capacity, disk free space or memory usage, value generating UDFs without input arguments can be used.

Complex value generating UDFs can be implemented using input arguments and parameters. While input arguments supply one or more field of values from the query table, parameters are used for supplying varying processing information. A general expression evaluation value generating UDF takes an expression as a parameter to process input arguments. The expression can be of any complexity. Expressions can contain user defined functions in scripting languages. In the expressions, the input argument fields are denoted either as field names as in the query or as $1, $2 and so on to identify input argument number 1, 2 and so on from left to right in the input field list. For example, given the radius of a circle as input, the expression evaluation value generating UDF can be given in a query as:

```
SELECT Evaluate(D.value) OUTPUT($1 AS area, $2 AS circumference)
    WITH PARAMETER(EXPRESSIONS=PI( )*$1*$1,2.0*PI( )*$1)
FROM drawing D, geometry G
WHERE G.type = 'radius' AND G.typeId = D.typeId;
```

It will be appreciated that there are two comma separated expressions in the parameter clause and that each expression generates the output in that order. An expression of the form $number in the parameter indicates input argument positions and $number expressions in OUTPUT expressions indicate output field positions. Expression evaluation value generating UDFs are very useful for generating buy/sell signals in conjunction with SIWF class type for stock market bar data analysis. A SIWF class type UDF can perform real-time stock market analytics, while an expression evaluation function evaluates the resulting output to generate stock buy/sell signals.

Row-Sending UDFs are not used for retrieving information in a query, but rather for sending rows from a database or a data source to an external application. They are not used with OLAP windows and their output cardinality is determinate. A row sending UDF application may append the rows to an existing file, create a new file, send the rows to another database for insertion, or provide the rows to an external application program for processing the rows. Databases are used for storage and retrieval of rows. There is no standard mechanism for sending rows from a database to an external application; database queries are used for retrieving rows. An application can retrieve rows and send the rows to any external application. However, having Row-Sending UDF class type serves the purpose of directly sending rows to external processing applications.

Databases can be configured to use Row-Sending UDFs as triggers to send rows when rows are modified or deleted in a table or new rows are inserted. Alternatively, Row-Sending UDF can be used in a query to send rows produced by the query to an external process. When Row-Sending UDFs are used as triggers to send modified, deleted or inserted rows to an outside application, there is no need for the UDF to return any value. Even if the UDF returns a value, it is ignored. However, when Row-Sending UDFs are used in a query statement, it returns the number of rows processed as output to the query.

The following example query shows how rows processed in a query can be sent to an external application that listens at a given TCP/IP address and port:

```
SELECT TCPRowsSender(orderId, timestamp, productName,
    itemCount, priceDollarPerItem, totalSalesDollarValue)
    OUTPUT(rowsCount)
        WITH PARAMETER(ADDRESS='195.165.25.82','3000')
    FROM sales
    WHERE timestamp >= (CURRENT_DATE( ) - 1 DAY);
```

A final class of user defined functions is the Table-Valued User Defined Function (TVUDF), which returns a table of data for processing in the query similar to accessing tables from the local data source. TVUDFs do not use OLAP windows and their output cardinality is indeterminate. In general, TVUDFs are used in the FROM clause of a SQL query. Different systems implement table valued UDFs in different ways. Some implementations use the concept of TVUDF to process SQL queries from the local data source itself and return a table of rows. In such cases, the query processor can have a TVUDF processing node in the query execution tree where the input SQL query is processed similar to a sub-query. In some other systems, table of rows are retrieved from external data sources. In all the cases, TVUDF is used for returning table of rows having multiple columns from UDF processing in the FROM clause of a query statement.

TVUDF class type is used here only to connect to external data sources and retrieve a table of rows in the FROM clause of a SQL query. When a TVUDF returns a table in the FROM clause along with other tables, the TVUDF table rows are processed further in the SQL set processing nodes similar to multiple table processing SQL queries. It will be appreciated, however, that a TVUDF does not need to be in the FROM clause when databases support SQL queries without a FROM clause. In such cases, a TVUDF can be used directly in the projection list of a SQL query as a standalone query or a sub-query without a FROM clause. When occurring in the projection list, the TVUDF is treated as a singleton UDF.

When TVUDFs are defined without any input arguments, they are used in the FROM clause or as a sub-query to return table of rows from external data sources into the query for further processing. Thus, the TVUDFs are linked to the query only through the return table. The external data source can be a structured or unstructured data source. Each TVUDF knows the type of the external data source, obtains access to the external source through the parameters, and sends the query or processing instructions to the external data source to return a table of structured rows.

In the case of unstructured data sources, TVUDFs process and extract table of rows. In such cases, TVUDFs exhibit the characteristics of mapping functions in map/reduce processing systems. Mapping functions, in general, are defined to convert unstructured data sources into key/value pairs where key and value could comprise of multiple fields. In structured systems, tables consist of a number of dimension and value fields which are similar to key/value pairs of map/reduce systems. External unstructured data sources can include data files, live data streams from the stock market or sensors, web-pages, or systems that manage unstructured data sources. For each such external data source, a separate TVUDF can be used for table extraction. TVUDFs can be combined with INSERT statements for data retrieval from external sources and loading the rows into the database.

In the case of structured data sources, TVUDFs either pick up a table of rows residing in some data source repository directly or return a table of rows resulting from the processing of queries in the external structured data sources. External structured data sources can include structured record files, spread-sheets, databases, or any structured row supplying or processing system that returns a table of rows with or without a query. Record files can be of different kinds such as comma separated value (CSV) files, fixed text or binary data files containing a table of rows. As with the unstructured data sources, a separate TVUDF can be used for table extraction from each structured data source. The following example query demonstrates the use of a TVUDF:

```
SELECT T.year, T.quarter, PercentShare(sum(T.sumSales))
    OUTPUT($1 AS quarterSales, runningSum AS
    yearToDateSales,
        percentShare AS percentQuarterSales,
        runningPercentShare AS percentYearToDateSales)
    OVER(PARTITION BY T.year ORDER BY ASC T.quarter)
FROM
    ((SELECT year, quarter, sum(salesValue) AS sumSales
```

```
        FROM salesEurope
        WHERE year >= YEAR(CURRENT_DATE( )) - 4
        GROUP BY year, quarter)
    UNION ALL
    (ODBCQueryReader( ) OUTPUT($1 AS year, $2 AS quarter,
            $3 AS sumSales)
        WITH PARAMETER(ODBC_DSN='USSalesDB':
            USER='admin','secret':
            QUERY='SELECT year, quarter,
                    sum(salesValue) AS sumSales
                FROM salesUS
                    WHERE year >= YEAR(CURRENT_DATE( )) - 4
                GROUP BY year, quarter')) AS T
GROUP BY T.year, T.quarter;
```

It will be appreciated that the example query given above uses two UDFs where one is a TVUDF that occurs in the FROM clause, ODBCQueryReader, and the other is a rank-type UDF, PercentShare. This query processes market percent share analytics for year and quarter on sales data for Europe from the local database and for the US data from an external ODBC data source retrieved by a TVUDF. The PercentShare function is a rank-type UDF that receives aggregated sum grouped across year and quarter. The percent share analytic function receives sum(T.sumSales) grouped across year and quarter in the main query and computes the market share for each quarter over each year. It should be noted that the TVUDF does not require any input arguments in the query function. TVUDFs receive processing input in the form of parameters for accessing their associated data source and a query for extracting the relevant data from the external source. In general, the input arguments for UDFs conform to table of rows consisting of one or more fields from the query table, but for TVUDFs there are no such input fields from the query, and therefore, an empty input table object is supplied for processing TVUDFs.

The query parser 74 can review the input query to ensure that the call to each user defined function is valid. To this end, the query parser 74 can retrieve the associated class type of each user defined function from the metadata 69 and apply a set of logical rules to the query to evaluate the validity of each function call. For example, the SQL OLAP window specification is an important framework for processing analytic functions in queries in databases and business intelligence products. Aggregate, rank-type, series, SIWF, MRRA and NTM UDF class types use OLAP windows, and can be used with appropriate OLAP expressions for designating data partitioning. OLAP window class types without OLAP window expression use the entire rows from the query table. The GROUP BY clause is very limited in scope for processing when it comes to processing data using different sets of partition order. OLAP PARTITION BY processing applies only to the functions for which the OLAP window clause is expressed. Classifying UDFs to fit into the OLAP framework and defining class types to designate UDFs that use OLAP windows and that do not use OLAP windows provides wider application processing features within databases.

The various UDF class types are designed to bring different kinds of processing functions for use in a SQL query so that their results can be projected into the select list in a manner similar to inbuilt OLAP analytical functions. All the UDF class types can be used in the projection list of a query statement except TVUDFs, which are generally used in the FROM clause of a SQL query. It will be appreciated, however, that when the FROM clause is not mandatory in a query, a singleton TVUDF can be used in the projection list of a query. Value generating UDFs can be used anywhere in a query where an expression can be used.

Similarly, user defined functions belonging to the aggregate, rank, series, and SIWF class types have the "OLAP Window Plurality" property and can occur in a query with multiple user defined functions in any combination, in a manner similar to inbuilt GROUP BY or OLAP window functions. As a general rule, user defined functions belonging to the MRRA, NTM and OTM class types, referred to herein as singleton user defined functions, occur as a single UDF in its associated query or sub-query. Singleton user defined functions have an indeterminate output number of rows. There is no restriction the number of singleton user defined function sub-queries in a query. Row-sending user defined functions also belong to the singleton user defined function type, though its output is determinate in a query in which the number of output rows is equal to the number of input rows. Singleton UDFs are defined only for processing convenience for UDFs that return indeterminate number of output rows. However, with good query optimization and join processing this limitation can be removed in database systems.

In the case of inbuilt rank-type analytic OLAP functions, there are no input arguments for the functions. However, the lists of fields in the ORDER BY clause are implicitly considered as the input arguments for the inbuilt rank-type analytic functions. It will be appreciated, however, that there can be input arguments in the rank-type UDFs when there is an ORDER BY expression for the function. In such cases, the input arguments in the function are considered as the only input arguments and the list of fields in the ORDER BY clause are considered as fields for data sorting purposes only. However, there is no restriction in using the fields from the ORDER BY clause as input arguments in the UDF. When there are no input arguments in rank-type UDFs, the fields in the ORDER BY clause are mandatory and are considered as input arguments similar to inbuilt rank-type UDFs.

A query optimizer 76 establishes a query plan for executing the received query. It will be appreciate that the query optimizer 76 can use the associated class type of any user defined functions in the query in constructing the query plan. For example, the query optimizer 76 can retrieve metadata describing the associated class types of the user defined functions, and uses the associated class type of each user defined function to determine if the number of rows in the output of the function is determinate or if the output to the function is indeterminate. For class types having known outputs, the query optimizer 76 can proceed normally. Functions having indeterminate outputs are handled as part of an alternative optimization process, in which the potential impact of a function having a large number of output rows is mitigated. Each of the data object extracted by the query parser 72 and the query plan developed at the query optimizer 76 are provided to the processing engine 64 to execute the query, including the user defined function.

The processing engine 64 uses the extracted input data table objects to execute the called function and return the results of the function as the mapped output fields. The processing engine 64 is provided with the input fields in the order the input fields are defined in the user defined function input field metadata. There is no need for the input field names from the query to match the input field names in the UDF metadata as the input field metadata names are just placeholders. Variable input or output fields are expanded with the right repetition numbers in consecutive positions as given in the input fields of the UDF in the query. The base field name of the variable field is expanded by appending it with the ordinal number of the field starting from one. Output fields from user defined function are mapped in queries using field names from the UDF metadata or field position identifier in a $# syntax. Output fields can be renamed using an appropriate syntax, for example: <$#/field name>[AS]<user defined output field name>. When the field position identifiers are not renamed in the output expression, the query compiler 62 replaces them with output field names obtained from the user defined function metadata. User queries can map a subset of output fields from user defined function in any order irrespective of their order in the metadata. When output is not explicitly mapped in a query, the results of the output fields marked as default output fields in the metadata are returned. When output is mapped as OUTPUT(*) all the output fields from the UDF are returned. These approaches simplify the application programming interface (API) for user defined function development with a derived UDF class from the abstract UDF processing API class having one member function for registering parameter input, a second member function with input and output table objects to start the processing, and a third member function to iteratively process input table object with one or more input records and emit output rows into the output table object according to the class type of the user defined function. An initialization function is required in case multiple data sets are processed using the same UDF processing object instance.

The processing engine 64 executes the query plan to provide a query result, and returns the query result to the query source via the communications interface 56. During runtime, data are loaded into the input table object according to the user defined function class type and other metadata specifications. With the input and output table objects as arguments, the data processing API of the user defined function is called to process data. The user defined function emits output, representing the analytic function associated with the user defined function, into the output table object which is retrieved each time the processing function is called. In case there is no input, as in the case of table-valued user defined functions, the processing function is called with an empty input table object. In addition to the input and output tables, the processing function needs one more argument to indicate processing scenario such as accumulate, process and emit, and emit only. Accumulate is an instruction to the process for functions that could receive one row at a time so that functions accumulate the intermediate results until process and emit instruction is given. Process and emit is an instruction to process all the rows in the input table and emit the output result. Process and emit indicates end of data for aggregate and MRRA class types. Emit is the instruction to retrieve output rows until outputs are finished. Output rows could be returned in multiple installments using the emit command when there are many output rows, beyond the capacity of the buffer size set in the output table. The end of output is detected when the output table returns without any row.

The system 50 further provides the ability to map the output fields from user defined functions in any order, making it easier to have nested user defined function queries where inner user defined functions return outputs required for the input of outer user defined functions. This helps in building complex applications in parts and composed by nesting UDFs in queries according to application requirement. The tight integration of user defined functions into SQL brings analytic application processing closer to the data, resulting in data security and less mobility of data across systems. It also makes it more efficient to build user defined functions for serving vertical applications through SQL in a programming language. With table-valued user defined functions available for use in FROM clause of queries for collecting data from external sources in conjunction with the analytic user defined functions, users will find many analytic applications easier to model and process using data from internal and external sources in SQL databases.

Figure 3:
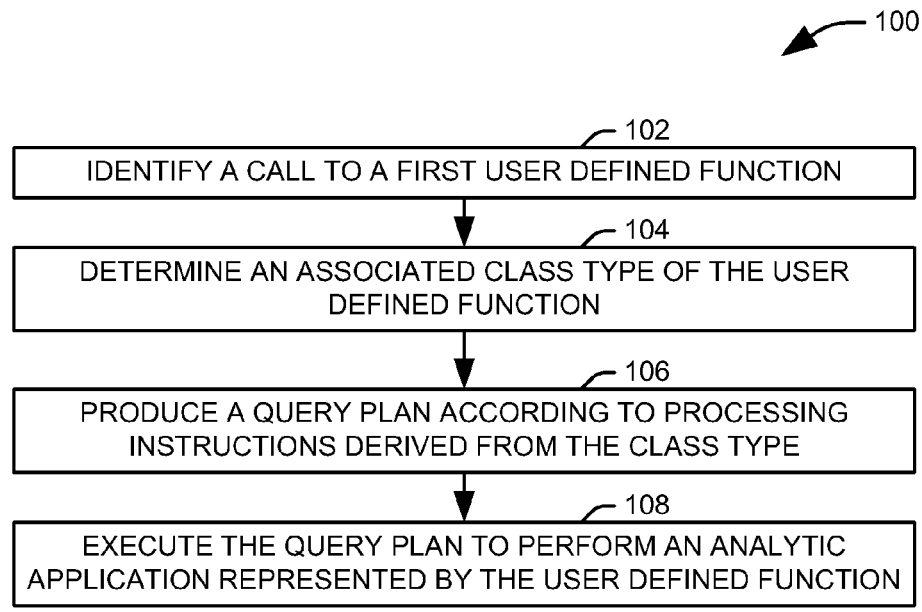
FIG. 3 illustrates one method for executing a query.

FIG. 3 illustrates one method 100 for performing an analytics application. At 102, a call to a user defined function is identified within a query of an associated data table. An associated class type of the user defined function is retrieved from the metadata of the user defined function at 104. At 106, a query plan is produced according to a plurality of processing instructions derived from the retrieved UDF class type, and the query plan is executed to perform the analytic application represented by the user defined function at 108.

Figure 4:
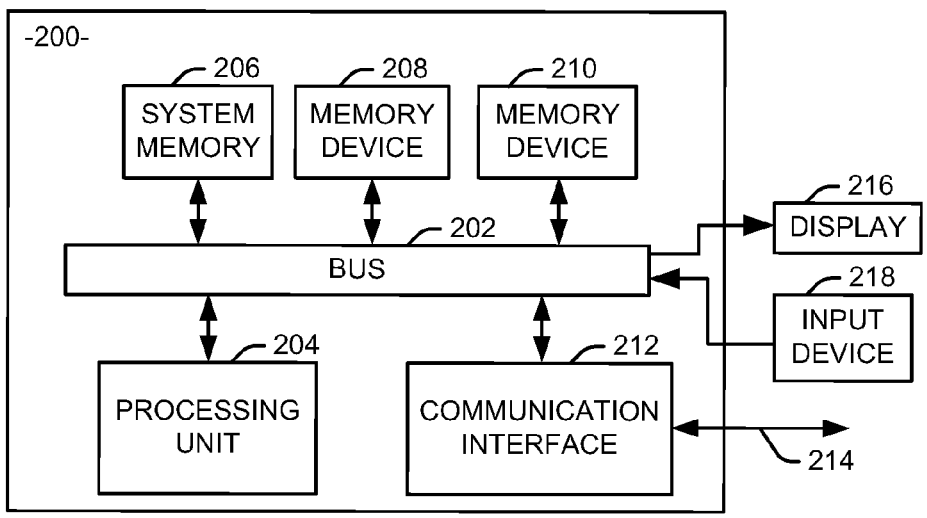
FIG. 4 is a schematic block diagram illustrating an exemplary system of hardware components capable of implementing examples of the systems and methods for user defined function integration disclosed in FIGS. 1-3.

FIG. 4 is a schematic block diagram illustrating an exemplary system 200 of hardware components capable of implementing the example systems and methods for user defined function integration disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, or any other appropriate processing component.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 operably interconnects the processing unit 204, the memory devices 206-210, the communication interface 212, the display 216, and the input device 218. In some examples, the system bus 202 also operably interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio.

Additionally, the memory devices 208 and 210 can serve as databases or data storage. Additionally or alternatively, the system 200 can access an external data source or query source through the communication interface 212, which can communicate with the system bus 202 and the communication link 214.

In operation, the system 200 can be used to implement a database system that executes user defined functions within or outside of an online analytics processing (OLAP) framework in response to an appropriate query. The queries can be formatted in accordance with various query database protocols, including SQL. Computer executable logic for implementing the real-time analytics system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. An analytical data processing system comprising:
   a non-transitory computer readable medium storing machine readable instructions, the machine readable instructions comprising:
      a plurality of user defined functions, each having metadata defining an associated class type, where a given class type is associated with a plural set of user defined functions; and
      a query compiler configured to:
         identify a call to a given user defined function of the plurality of user defined functions within a query of an associated data table,
         retrieve the associated class type of the user defined function from the metadata of the user defined function,
         provide a query plan according to a plurality of processing instructions derived from the retrieved class type, where the plurality of processing instructions derived from the class type includes an instruction to determine:
            an associated output cardinality of the user defined function, and
            whether the user defined function can be processed in an online analytics processing window,
         where the output cardinality indicates whether the given user defined function produces, from a given set of input rows, an indeterminate number of output rows, a single output row, or a determinate, known number of output rows comprising at least two output rows, and
         validate the query according to the associated class type of the user defined function such that only the user defined function configured to be processed in the online analytical window are designated to be processed in an online analytical window; and
   a processor operatively connected to the non-transitory computer readable medium and configured to execute the machine readable instructions.

2. The analytical data processing system of claim 1, the processing instruction defining the output cardinality of the user defined function.

3. The analytical data processing system of claim 2, the processing instruction indicating that the user defined function produces a number of output rows equal to a number of input rows.

4. The analytical data processing system of claim 2, the processing instruction indicating that the user defined function produces one output row from a given set of input rows.

5. The analytical data processing system of claim 1, the processing instruction defining one of a plurality of associated processing scenarios for the user defined function, a first processing scenario requiring input rows to be provided to the user defined function one at a time and a second processing scenario requiring all the input rows to be provided simultaneously to the user defined function.

6. The analytic data processing system of claim 1, the processing instruction indicating whether the user defined function is configured to be processed in an online analytics processing (OLAP) window.

7. The analytic data processing system of claim 1, the processing instruction indicating that an output field of the user defined function is projected into a SELECT projection list of the query.

8. The analytical data processing system of claim 1, the processing instruction indicating that the user defined function is configured to receive input rows in a sorted order.

9. The analytic data processing system of claim 1, the processing instruction indicating one of that the user defined function is configured to occur anywhere within a query in which an expression can occur and that the user defined function is limited to a projection list of the query.

10. A non-transitory computer readable medium comprising:
    a query parser configured to identify calls to a plurality of user defined functions within a query of an associated data table and retrieve associated class types of the user defined functions from metadata associated with the user defined functions, where a given class type is associated with a plural set of user defined functions;
    a query optimizer configured to provide a query plan according to a plurality of processing instructions derived from the retrieved function class types, the processing instructions for each class type including at least an instruction to determine whether functions associated with the class type can be processed in an online analytics processing window, and whether the functions associated with the class type have an indeterminate output cardinality, and reject the query associated with the query plan if more than one user defined function in the query has an indeterminate output cardinality; and
    a processing engine configured to process the query plan to execute an analytic function represented by the user defined function.

11. The non-transitory computer readable medium of claim 10, the query parser validating the query according a rule derived from the associated class type of the user defined function.

12. An analytical data processing system comprising:
    a non-transitory computer readable medium storing machine readable instructions, the machine readable instructions comprising:
       a plurality of user defined functions, each having metadata defining an associated class type, where a given class type is associated with a plural set of the plurality of user defined functions; and
       a query compiler configured to:
          identify a call to a user defined function within a query of an associated data table,
          retrieve the associated class type of the user defined function from the metadata of the user defined function,
          validate the query according to the associated class type of the user defined function, such that only user defined functions belonging to a class type configured to be processed in an online analytics processing window are designated to be processed in an online analytical window, determine an associated cardinality of the user defined function from the associated class type, and whether the user defined function can be processed in an online analytics processing window, where the cardinality of the function indicating if a number of rows output by the function is known or unknown at the time the query is validated given the number of input rows, and provide a query plan according to the determined cardinality; and a processor operatively connected to the non-transitory computer readable medium and configured to execute the machine readable instructions.

13. The analytical data processing system of claim 1, wherein the validated query is processed in an online analytical window.

* * * * *